(12) United States Patent
Ambrose et al.

(10) Patent No.: US 7,945,683 B1
(45) Date of Patent: May 17, 2011

(54) METHOD AND SYSTEM FOR MULTI-TIERED SEARCH OVER A HIGH LATENCY NETWORK

(75) Inventors: Jesse Ambrose, San Jose, CA (US);
Michael Flexer, Palo Alto, CA (US);
King-Hwa Lee, Newcastle, WA (US);
Hans Kedefors, Hillsborough, CA (US);
Peter S. Lim, Hillsborough, CA (US);
David Tchankotadze, Sunnyvale, CA (US)

(73) Assignee: SAP AG, Walldorf (DE)

( * ) Notice: Subject to any disclaimer, the term of this patent is extended or adjusted under 35 U.S.C. 154(b) by 206 days.

(21) Appl. No.: 12/204,778

(22) Filed: Sep. 4, 2008

(51) Int. Cl.
*G06F 15/16* (2006.01)

(52) U.S. Cl. .......................... 709/228; 709/227; 707/609

(58) Field of Classification Search .................. 709/228, 709/227
See application file for complete search history.

(56) References Cited

U.S. PATENT DOCUMENTS

| 2007/0088681 A1* | 4/2007 | Aravamudan et al. | 707/3 |
| 2007/0094042 A1* | 4/2007 | Ramer et al. | 705/1 |

* cited by examiner

*Primary Examiner* — Joseph E Avellino
*Assistant Examiner* — Marshall McLeod
(74) *Attorney, Agent, or Firm* — Buckley, Maschoff & Talwalkar LLC

(57) ABSTRACT

A computer implemented method and system include executing a search against both a client cache associated with a client and data sources remotely coupled to the client over a network connection. Results from the search against the client cache are rendered on a client UI. The client cache and the client UI are updated with the results from the search against the data sources.

21 Claims, 13 Drawing Sheets

600

| | Contacts - Details | |
|---|---|---|
| Last Refresh | 7/30/2008 1:08 AM | |
| Name | Michael Normandin | |
| Salutation | Prof. | |
| Account name | eVidiblast | |
| Title | CFO | |
| Phone | (978) 578-4584 | |
| Email | Michael.C.Normanding@spa... | |
| Mailing street | 3320 Huntz Lane | |
| Mailing city | North Billerica | |
| Mailing postal code | 01862 | |
| Related Items | | Menu |

FIGURE 6

| | Contacts - Details | |
|---|---|---|
| Last Refresh | 7/30/2008 1:08 AM | |

| | |
|---|---|
| 1 Account | hael Normandin |
| 2 Cases | |
| 3 Notes | blast |
| 4 Opportunity contact roles | |
| | ) 578-4584 |

| 5 Yelp ▷ | 1 Restaurants | spa... |
|---|---|---|
| 6 Google Maps | 2 Hotels | |
| 7 LinkedIn | 3 Food | |

| Related Items | Menu |
|---|---|

FIGURE 7

METHOD AND SYSTEM FOR MULTI-TIERED SEARCH OVER A HIGH LATENCY NETWORK

FIELD OF THE INVENTION

The present application relates to network communications and, in particular, a method and system for accessing data.

BACKGROUND

Mobile users, especially business professionals, have a need to reliably access their data sources and internet sources any time, any place. Data sources and internet sources include, for example, contact information, customer information, transaction information, news, and company profiles. The following describes the importance of such information:
  a) Contact information. Business users need to have immediate access to all their business and personal contacts, out-of-the-office or in-the-office.
  b) Customer information. Business users need to have immediate access to their customer information.
  c) Transaction information. Business users need to have immediate access to orders, leads, service requests, invoices, quotes, and other business transaction information.
  d) News. Business users need up-to-date news information.
  e) Company Profiles. Business users look for companies that may become possible customers.

Use of the following applications and information have increased over the years.
  a) Data sources: Over the past several years, companies have been creating and collecting information in data sources. Business applications such as ERP, CRM, HR have become common-place at all businesses.
  b) Internet sources: Over the past several years, numerous web sites that store information such as emails, news, personal information, company information, financial information, airline flight information, etc. have become available to users over the world wide web. Most users use a web-browser to access this information.
  c) Mobile phones. Over the past several years, mobile phone shipments have been rapidly expanding across the world. In addition, wireless carriers and device manufacturers have been adding mobile browsers to allow users to access the world-wide-web on their mobile phones.
  d) Carrier networks. Although faster mobile carrier bandwidth is available in more and more cities, conventional carrier network bandwidth commonly may provide approximately 50-200 kbps of network bandwidth. It is common for web-browser requests to take 30+ seconds to render a web page on a mobile phone. In addition, due to the relatively long wavelength of current wireless network signals, users commonly encounter low or non-existent mobile phone coverage as they travel (e.g., no coverage while inside buildings, when line-of-sight to wireless towers is blocked by obstacles, etc.).
  e) Multiple computing devices. Conventionally, users may employ multiple computing devices in any one day. For example, it is common for business professionals to use a computer at their office, another computer at their home, and to have a mobile phone that they take with them wherever they go.
  f) Multiple Siloed applications. Users use various applications on their computing devices, such as a calendar program for tracking schedules and appointments, an email application for receiving and sending electronic messages, an address book for storing contact information, a to-do application for tracking tasks and their priorities, a CRM application for recording customer relationship information, an ERP application for recording accounting, inventory, and other back-office information, etc. Often, data in one application, such as contact information, is repeated in multiple applications. Commonly, the data in one siloed application is related to data in another siloed application.

Because these applications were built independently and by different vendors, users must use separate siloed applications to access their data. To view data for a given customer, users must re-input the information in each application. On computing devices such as mobile phones where data input methods are non-optimal or where network latency is high, re-inputting data is very time-consuming and frustrating to users. Due to the high burden on the user to re-input data, most mobile users today do not access their data on their computing devices.

As shown in FIG. 1, a common implementation is to provide a UI that is based on a web-browser to send every request over the public internet to a server for processing. The server consists of multiple components including: (1) a web server that handles http requests from the web-browsers and returns HTML to render in the web-browser; (2) an application server that retrieves data from the database server to return to the web server; and (3) a back-end DBMS server that stores all the data for the application.

The web-based UI architecture can be used on mobile devices such as cell phones by implementing a web-browser on the mobile device, and sending requests from the web browser to the server over a wireless carrier network. However, such an approach requires a network connection. Furthermore, response times over wireless carrier networks is slow.

FIG. 2 illustrates another conventional implementation. This implementation identifies a data set and loads it on a client machine for offline access. A Mobile Client UI can interact with the "snapshot" that is loaded on the client machine, enabling the use of the application without access to the server, thereby providing offline access when the client has limited or no network coverage.

The user is allowed to make data changes using the Mobile Client UI. These client changes are tracked, queued up, and applied to the server when network connectivity is re-established. A conventional optimization may include identifying and synchronizing incremental changes on the server and only re-transmitting records that have changed since the last synchronization, thereby minimizing network usage.

Many disadvantages are associated with this approach. A data subset must be specified and configured. Download of entire snapshots of data results in a heavy load on the server and network. The download process slows down and does not scale as data sets get larger when, for example, contact information is large (e.g., 100K contacts). In addition, data is only as fresh as the last synchronization.

FIG. 3 illustrates another exemplary conventional approach. In this approach, end users use both snapshot UI and web-based UIs in the same Client UI. The snapshot UI, as described above, is used as the primary UI to enable fast, offline access to the subset of data that the user has loaded on his client. The web-based UI, as described above, is offered as a secondary UI for the user to access data from the server that has not been loaded onto the client snapshot.

The disadvantages of this approach mirror those of the approaches discussed above. In addition, this approach undesirably provides separate and inconsistent UI behaviors, requiring the user to know which of the two UIs to use for his specific need.

SUMMARY

In one embodiment of the present invention, a computer implemented method and system include a client executing a search against both a client cache associated with a client, and against data sources remotely coupled to the client over a network connection. Results from the search against the client cache are rendered on a client UI. The client cache and the client UI are updated with the results from the search against the data sources.

In another embodiment of the present invention, an application server includes a server cache. The client communicates with the application server, which acts as a proxy against which the search is performed. The network connection with the application server is opened. The network connection is closed at a predetermined time in the absence of network activity with the application server. The network connection is reestablished upon indication of a user.

Many other features and embodiments of the present invention will be apparent from the accompanying drawings and from the following detailed description.

BRIEF DESCRIPTION OF THE DRAWINGS

The present disclosure is illustrated by way of example and not limited in the figures of the accompanying drawings in which like references indicate similar elements.

FIG. 6 illustrates a Client Detail UI in accordance with one embodiment of the present invention.

FIG. 7 illustrates a Client Detail UI showing a list of related data entities for a data record in accordance with one embodiment of the present invention.

DETAILED DESCRIPTION

Figure 1:
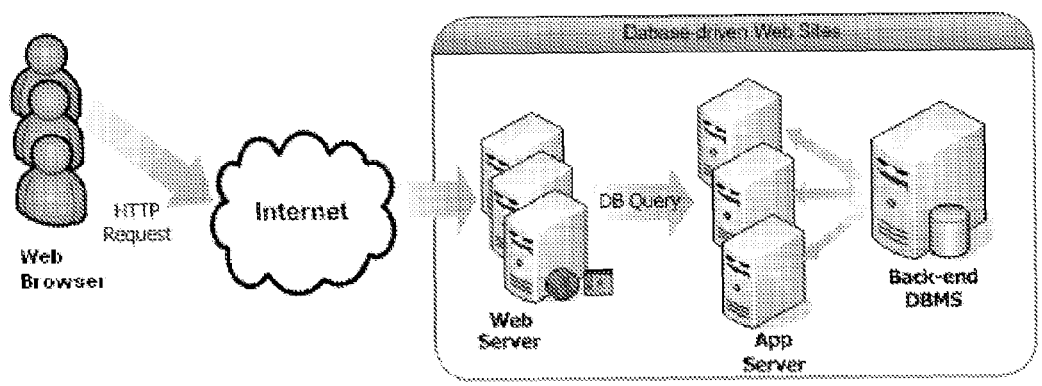
FIG. 1 illustrates a conventional user interface implementation in accordance with the prior art.
Figure 2:
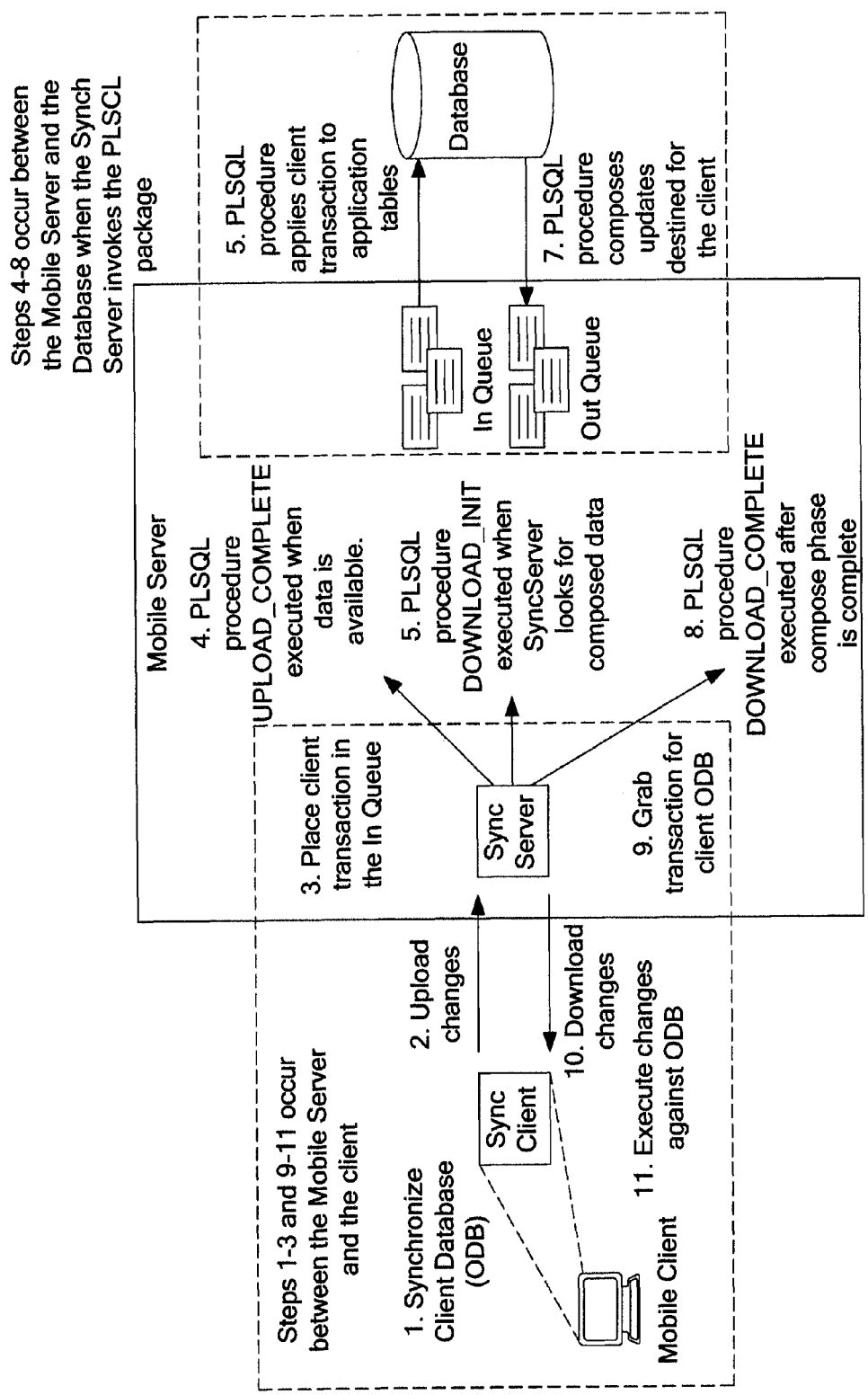
FIG. 2 illustrates a conventional snapshot implementation in accordance with the prior art.
Figure 3:
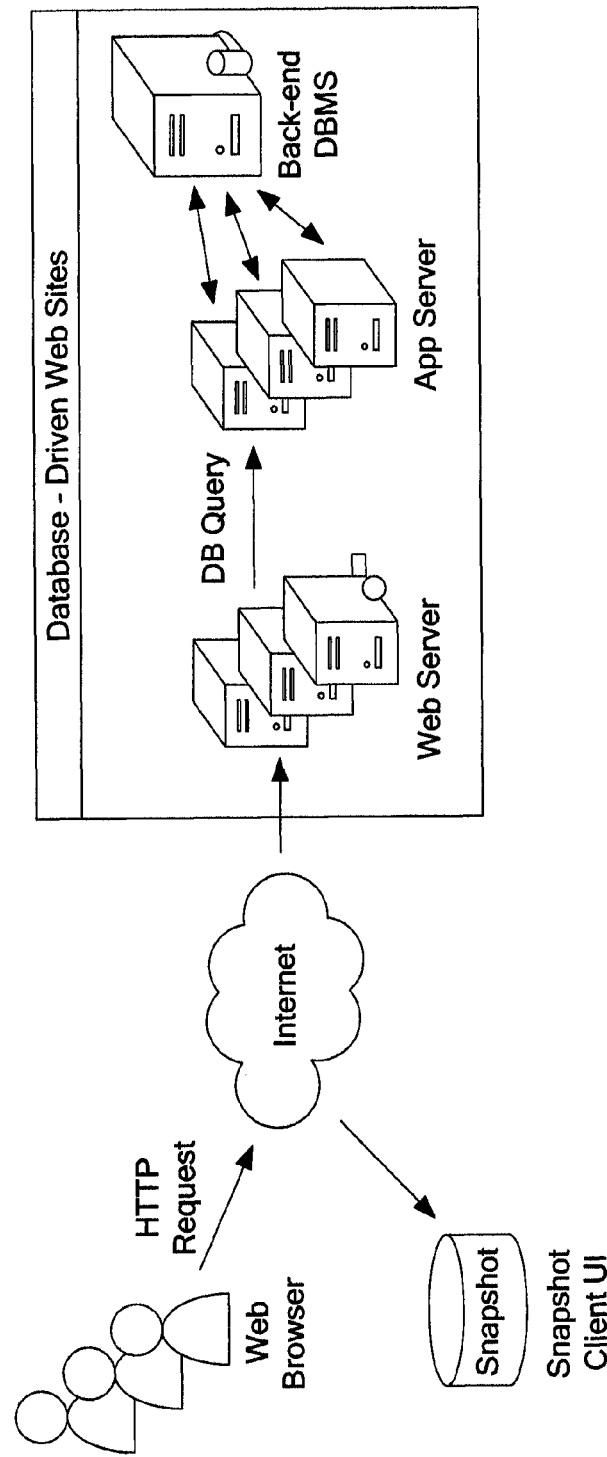
FIG. 3 illustrates a conventional hybrid implementation in accordance with the prior art.

In the following description, for purposes of explanation, numerous specific details are set forth in order to provide a thorough understanding of the description. It will be apparent, however, to one skilled in the art that embodiments of the disclosure can be practiced without these specific details. In other instances, structures and devices are shown in block diagram form in order to avoid obscuring the description.

Reference in this specification to "one embodiment", "an embodiment", "other embodiments", or the like means that a particular feature, structure, or characteristic described in connection with the embodiment is included in at least one embodiment of the disclosure. The appearances of, for example, the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

As the amount of data grows and the number of computing devices increases, it becomes more and more time-consuming and resource-intensive to synchronize data sets to multiple computing devices. Conventional solutions such as snapshots must regularly retrieve data to each computing device even when the end user may not be active. In addition, snapshot-based solutions must retrieve any and all data that the end user potentially may need, undesirably causing orders of magnitude more data to be transferred over networks and copied onto multiple computing devices. Very often, only a small portion, if any, of the transferred data is actually used.

The amount of computing and network resources needed is further increased under conventional techniques when multiple data sources are accessed by the user. Instead of querying against one data source, such as a contacts or companies database, it is common for end users to need access to multiple data source entities such as Contacts, Companies, Service Requests, Orders, etc. Additionally, end users commonly have access to multiple instances of the same type of data source entity, such as Contact records stored in a CRM system, Contact records stored in a personal address book, Contact records stored in a social networking application, and so on.

The present invention involves accessing the increasing amount of data on an increasing number of computing devices primarily by minimizing the amount of data downloaded to a Client User Interface (UI). Moreover, the present invention keeps Client List UI (301) behavior simple regardless of the size of the data set. The present invention requires relatively little or no maintenance from the end user. All of the data is simply available and ready to access with relatively extremely fast response time.

The benefits of the present invention include, for example, the following:

a) Sub-second response time in low-bandwidth, high-latency network;
b) Access to any size data set with minimal performance penalty;
c) Minimization of network transmission and storage use on clients, in comparison to conventional snapshot-based solutions;

d) Continuing to operate in low or no-network coverage conditions; and
e) Works well with data sources that limit requests, for example, data sources that have low request throughput, throttle requests, and/or limits to the number of requests per time period.

In one embodiment, the present invention can be used for mobile phones. In another embodiment, tablet personal computers, personal digital assistants (PDAs), laptop computers, wireless devices, electronic whiteboards (e.g., Smartboards), and other similar devices can be used. In one embodiment, the present invention can be used wherever immediate response time is desired, as well as in the presence of a constrained network (e.g., desktops with slow network connectivity to server, laptops with intermittent connection to servers, etc.).

End User Behavior

In one embodiment, the present invention may used for end users to quickly find a data record, such as a Contact record, a Company record, or a Opportunity record, from a large number of records stored in a data source.

Figure 4:
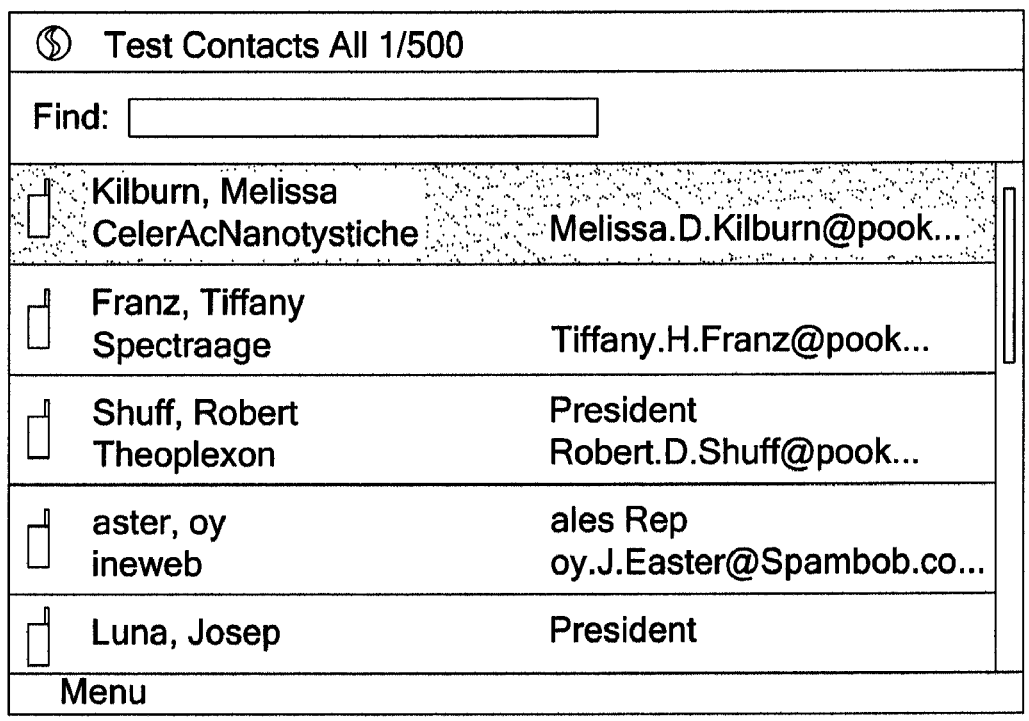
FIG. 4 illustrates a Client List UI in accordance with one embodiment of the present invention.

As shown in FIG. 4, to accomplish this, the end user is presented with a Client List UI (400) that renders a list of records from a data source. Each record in the list has one or more data fields whose values are rendered in the Client List UI (400). In one embodiment, the number of records in this data source can vary from a small number (e.g., tens of records) through a large number (e.g., thousands or even millions of records). Regardless of the number of records in the data source, in one embodiment, the Client List UI (400) is substantially similar to list-based UI shown in FIG. 4. In the example shown, there are at least 500 Contact records available in the Client List UI (400).

Figure 5:
FIG. 5 illustrates a Find Text Box in accordance with one embodiment of the present invention.

As show in FIG. 5, at the top of the Client List UI is a Find text box (500) where an end user may enter a text string. When the end user enters a value in the Find text box, the Client List UI (400) filters the list of records to those that match the entered text string. In this example, entering the text "Michael" has reduced the number of records in the Client List UI (400) to 52 records. By entering the text string in the Find text box (500), the end user has effectively reduced the list to make it easy for a person to find the record that the end user is interested in.

As shown in FIG. 6, after finding the record of interest, the end user can "drilldown" into the record to view detailed information about the record of interest in the form of a Client Detail UI (600). For example, while viewing a Contact record, the end user can view Name, Account names, Title, Phone numbers, Email addresses, Mailing address and other information about the Contact record.

As shown in FIG. 7, in addition, the end user can also view related information about the record of interest. For example, while viewing a Contact record, the end user can easily see Accounts, Cases, Notes, Opportunities, Yelp Businesses, Google Maps, LinkedIn, and other information related to the Contact record.

Exemplary Components

Figure 8:
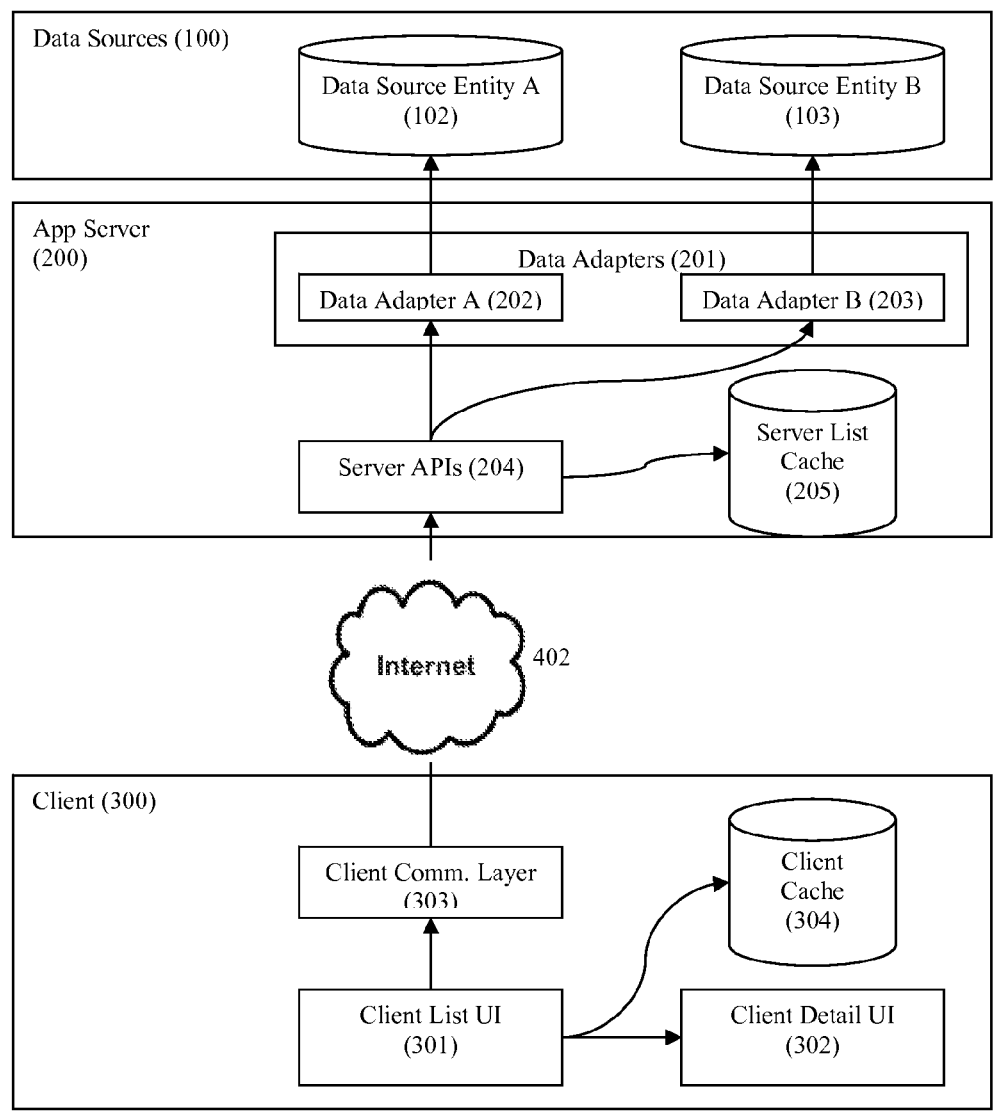
FIG. 8 illustrates a system in accordance with one embodiment of the present invention.

FIG. 8 shows data sources (100), App Server (200), and Client (300) in accordance with one embodiment of the present invention.

Data Sources (100) are computing systems that store and manage data. In one embodiment, there could be one or more data sources as depicted by Data Source Entity A (102) and Data Source Entity B (103). In one embodiment, a data source may be implemented in a back-end DBMS such as relational database, may be stored in a remote computing system and accessible via a public interface such as SOAP or REST APIs over HTTP, and/or may be publicly available over the internet.

App Server (200) acts as an intermediary between Data Sources (100) and Client (300). The App Server (200) connects to Data Sources (100) via Data Adapters (201). The data adapter (201) is a library of code that connects to the Data Source (100) and is able to read/write data to the Data Source (100). In the diagram, Data Adapter A (202) connects to Data Source Entity A (102) while Data Adapter B (203) connects to Data Source Entity B (103).

Server APIs (204) provide an application programming interface to clients (300) that need to access the data from the Data Sources (100). The Server APIs (204) utilize a Server List Cache (205) to speed up access to the data and minimize requests to Data Sources (100).

Client (300) provides the user interface for the end user to interact with the data. A Client List UI (301), which is similar or identical to the Client List UI (400), displays a list of records from a Data Source (100) that matches a search specification. For example, this may be a list of contact records that matches the last name "Smith". The Client List UI (301) contains a "Find text box", which is similar or identical to the Find Text Box (500), that lets the end user further filter the result list. While viewing records on the Client List UI (301), the end user can drilldown on a particular record to view the Client Detail UI (302). The Client Detail UI (302) displays all the fields and values of a specific record, such as First Name, Last Name, Work Phone, Email Address, Title, Birthday, and so on.

The Client (300) communicates with the App Server (200) over a network (402) such as the internet (402). In one embodiment, the communication uses standard communication protocols such as XML messages over HTTP. In other embodiments, other communication protocols including proprietary protocols, may be used. In addition, requests exchanged between the Client (300) and the App Server (200) may be encrypted to ensure security of the transfer, and/or compressed to minimize bandwidth usage of the network such as the internet (402).

The Client (300) uses a Client Cache (304) to store data for immediate access. Usually, the cache contains a set of previously accessed data. The Client Cache (304) is not required for proper functioning of the Client (300), but is provided to improve response time and minimize network traffic with the App Server (200).

Client List UI Method

The Client List UI (301) interacts with the Server APIs (204) to provide the desired end user behavior described above. The Client List UI (301) executes a query against the Client Cache (304) and also against the Server APIs (204). The query against the Client Cache (304) returns immediately and provides near-instantaneous response time to the end user since the operation completes entirely in the Client UI (300). The query against the Server APIs (204) searches for additional matches from the data source that may not already reside in the Client Cache (304). In one embodiment, the query against the Server APIs (204) is optional and only occurs if a network connection between the Client UI (300) and Server APIs (204) is available; thereby, allowing the Client UI to function isolated from the network (402).

Method Summary

The Client List UI (301) uses a multi-tiered caching scheme involving a Client Cache (304), an optional Server List Cache (205), and access to a Data Source (100).

Figure 9:
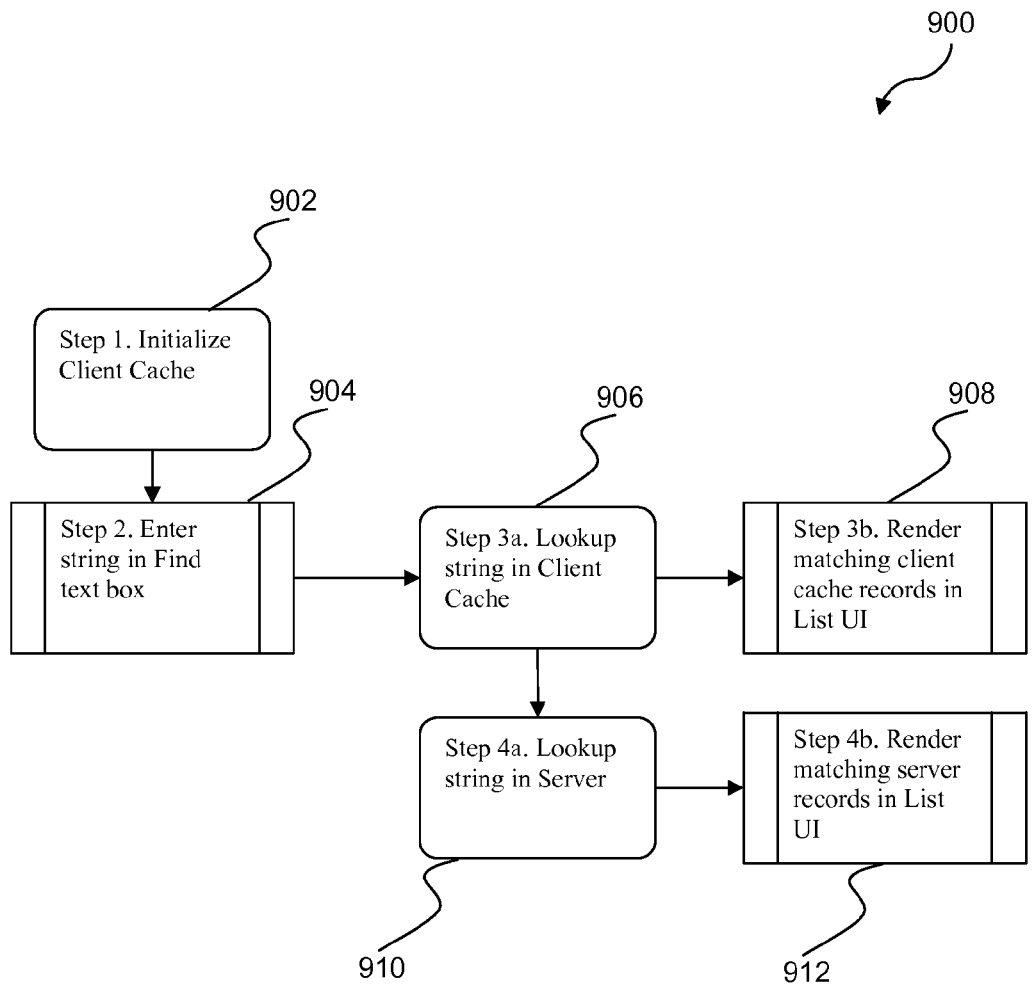
FIG. 9 is a flow chart of a method for populating a Client List UI utilizing a Client Cache and an optional connection to a Server in accordance with one embodiment of the present invention.

FIG. 9 shows a flow diagram of a method (900) in accordance with one embodiment of the present invention.

Step 1 (902). (Optionally) Initialize the client cache (304) with a subset of data from the Data Source (100). The initialization can involve tuning to anywhere between 0 records, a specified subset of records, and all of the actual data source records.

Step 2 (904). End user enters a search text in the Client List UI (301) Find text box 500.

Step 3. Find matching records in the client cache (304).
  i) Step 3a (906). Find matches in the client cache (304).
  ii) Step 3b (908). Render results in the Client List UI (301) with sub-second response time.

Step 4. In parallel, find matching records in the server.
  iii) Step 4a (910). Execute find against Data Source (100) via the Server APIs (204).
  iv) Step 4b (912). Update results in the Client List UI (301).

Various alternative implementations are possible. In one embodiment, all records from the data source are cached in the client cache (304), and Step 4 (910, 912) is bypassed if the number of records in the data source entity is less than a threshold A (e.g., 500 records).

In another embodiment, if the number of records in the Data Source Entity (101 or 102) is less than a threshold B (e.g., 5,000 records) or requests to the Data Source (100) are costly or limited in number, a Server List Cache (205) is created that stores a cache of the data source records to improve response time by eliminating requests to the Data Source (100).

Initialization Method

Figure 10:
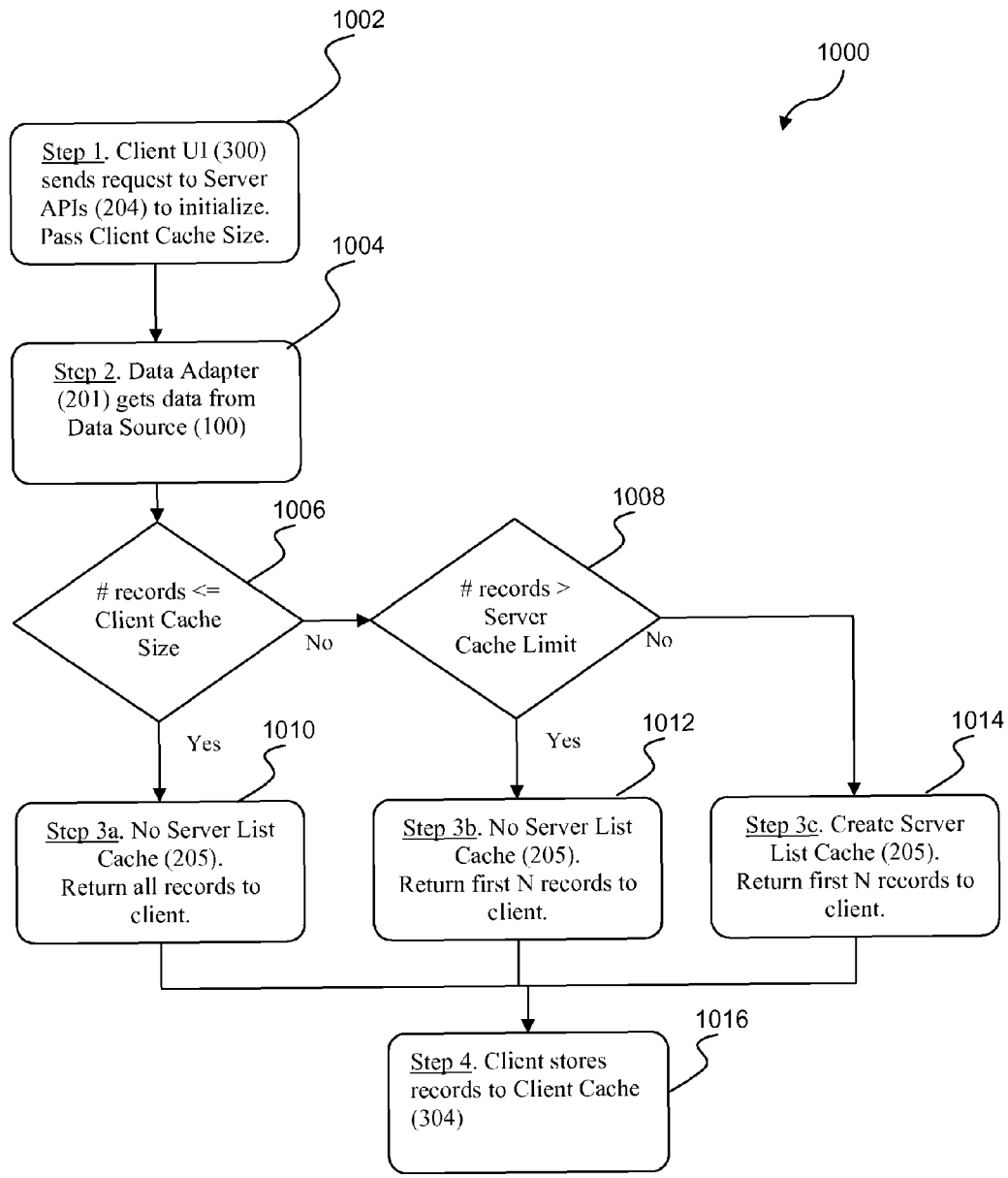
FIG. 10 is a flow chart of a method for populating a Client Cache and an optional Server Cache in accordance with one embodiment of the present invention.

FIG. 10 shows an initialization method (1000) in accordance with one embodiment of the present invention. When user first navigates to the Client List UI (301) for a given data source entity, the Client UI (300) initializes a set of records in the Client Cache (304). In one embodiment, this initialization is a synchronous request with the number of records to load into the Client Cache (304), optimized to complete in one minute or less. In another embodiment, this client-side initialization can be made to execute in the background so the end user does not wait for the operation to complete.

Step 1 (1002). The Client UI (300) conveys to App Server (200) how many records to initialize for the client-side cache by passing a Client Cache Size parameter.

In one embodiment involving a client with high bandwidth access to the server, this parameter may be a large number like 1,000. In another embodiment involving lower bandwidth clients, this may be a much smaller number like 100.

Step 2 (1004). Server APIs (204) use the Data Source Adapters (201) to query back-end Data Sources (100) for data records.

At decision step 1006, it is determined whether the number of records is less than or equal to the client cache size. If yes, the method (1000) proceeds to Step 3a (1010). If no, the method (1000) proceeds to decision step (1008). At decision step (1008), it is determined whether the number of records is greater than the Server Cache Limit. If yes, the method (1000) proceeds to Step 3b (1012). If no, the method (1000) proceeds to Step 3c (1014).

Step 3. Server APIs (204) populate a Server List Cache (205) depending on the number of records returned from the Data Source (100).

Step 3a. (1010) Case 1: Client Cache (304) has enough storage to contain all records. If the number of records from Data Source Entity (101 or 102) is less than or equal to the size of Client Cache (304), then Server APIs (204) return all records to Client UI (300). This case provides the similar functionality as a snapshot-based solution: all records are retrieved and inserted into the Client Cache (304) and all searches can occur locally on the Client UI (300). No server list caching occurs since all the records fit in the Client Cache (304).

Step 3b. (1012) Case 2: Too many records to fit in Server List Cache. If the Data Source Entity (101 or 102) returns more than a specified number of records (e.g., 10,000 records), the Server APIs (204) do not establish a Server List Cache (205). Server APIs (204) return the first N records from the Data Source entity (101 or 102) to the Client (300).

Step 3c. (1014) Case 3: Create Server List Cache (205) to supplement Client Cache (304). If the number of records from Data Source Entity (101 or 102) is greater than the size of Client Cache (304), then Server APIs (204) cache all results in the Server List Cache (205). Server APIs (204) return the first N records in the cache to the Client (300).

Step 4 (1016). Client (300) stores returned records into the Client Cache (304).

Find String Method

Figure 11:
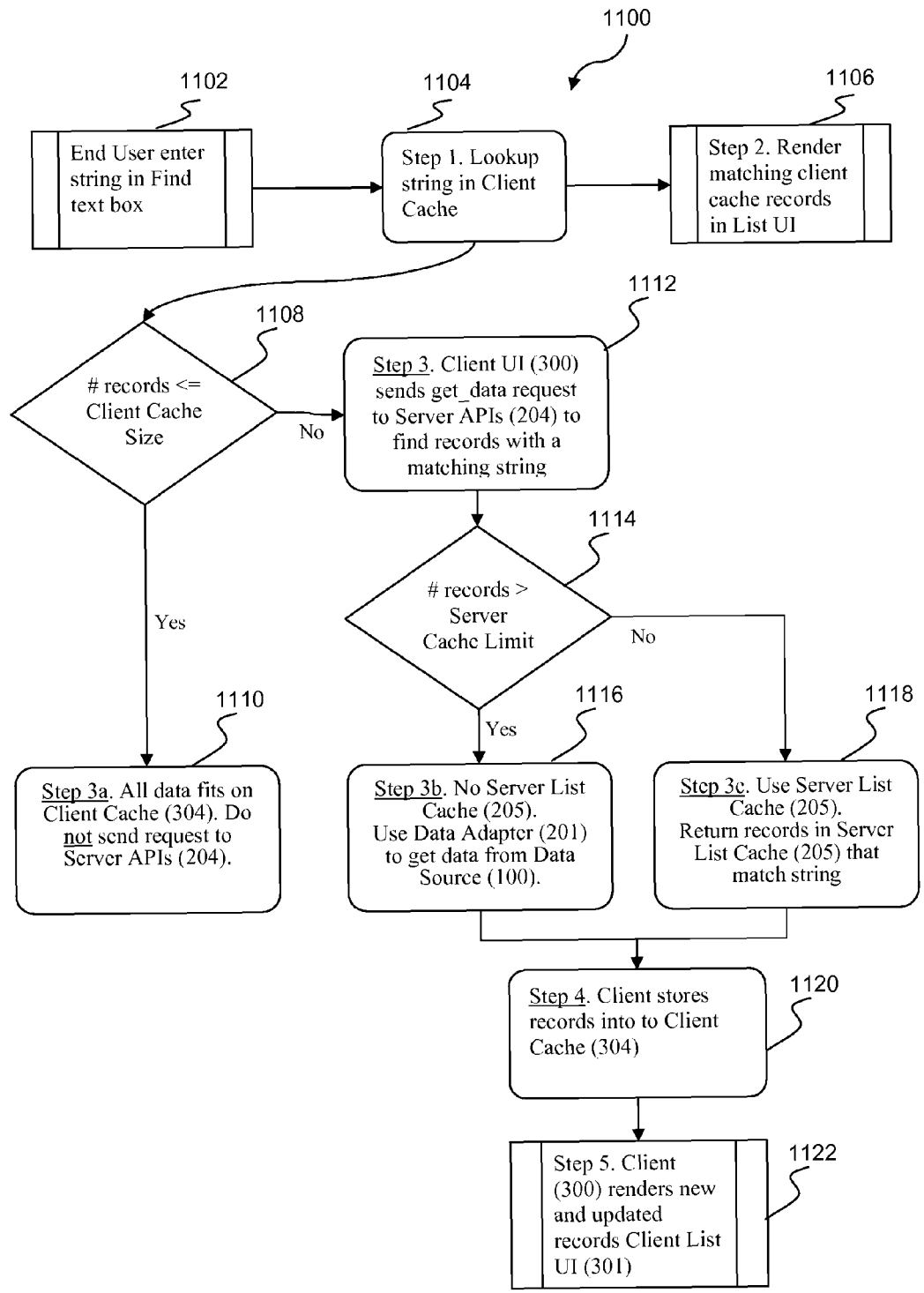
FIG. 11 is a flow chart of a method for finding a matching record and populating a Client List UI utilizing concurrent requests searching across a Client Cache, a Server Cache and an external Data Source in accordance with one embodiment of the present invention.

FIG. 11 shows a method (1100) involving use by an end user of the Client List UI (301) to find matching records. The method (1100) begins at a step (1102) where the end user enters a string in the Find text box (500). The method (1100) proceeds as follows:

Step 1 (1104). Client List UI (301) performs find against Client Cache (304). The method (1104) proceeds to Step 2 (1106) and decision block (1108). At decision block (1108), it is determined whether the number of records is less than or equal to Client Cache Size. If yes, the method (1100) proceeds to Step 3a (1110). If no, the method (1100) proceeds to Step 3 (1112).

Step 2 (1106). Client List UI (301) renders results from client cache.

Step 3 (1112). Client List UI (301) performs find against the server.

The method (1100) proceeds to decision block (1114). At decision block (1114), it is determined whether the number of records is greater than Server Cache Limit. If yes, the method (1100) proceeds to Step 3b (1116). If no, the method (1100) proceeds to Step 3c (1118).

Step 3a (1110) Case 1: Client Cache (304) has enough storage to contain all records. If the number of records from Data Source Entity (101 or 102) is less than or equal to the size of Client Cache (304), then do not send a request to the Server APIs (204) and the method (1100) ends.

Step 3b (1116) Case 2: Too many records to fit in Server List Cache. Execute a find request against the Server APIs (205) to retrieve any new records not in the Client Cache (304) and to retrieve any updates to records already in the Client Cache (304). Because no Server List Cache (205) exists for this Data Source Entity, the Server APIs (204) execute queries directly against the Data Source (100). Matching records are returned to the Client (300).

Step 3c (1118) Case 3: Use Server List Cache (205) to supplement Client Cache (304). Execute a find request against Server APIs (205) using the previously populated Server List Cache (205) to retrieve any new records not in the Client Cache (304) and to retrieve any updates to records already in the Client Cache (304). Matching records are returned to the Client (300).

Step 4 (1120). Client (300) stores returned records into the Client Cache (304).

Step 5 (1122). Client (300) renders new and updated records from server on Client List UI (301).

Refresh Cache Method

The Client Cache (304) and the Server List Cache (205) can be refreshed. First, the end user can explicitly request a refresh of the data. For example, the end user may know that there is a recently inserted or updated record in a data source entity and accordingly may want to see the new information. During a refresh, the entire Server List Cache is refreshed and the client cache is reinitialized.

In addition, the caches can be periodically refreshed. For example, the end user can choose to have a refresh occur on a daily basis. As another example, a refresh can occur when an end user begins to re-use the client, or otherwise provides an appropriate indication; and a predetermined number of hours, which may constitute a predetermined maximum time, have elapsed since the last refresh.

In another embodiment, the Data Source (100) sends a notification to the App Server (200) that newly inserted or updated data is available. The App Server (200) updates the appropriate Server List Cache (205). The App Server (200) may also optionally send notifications to the Client UIs (300) to update their Client Cache (304).

Client Detail UI

The end user can select a data record in the Client List UI (301), and drilldown to the Client Detail UI (302) to view additional details about the data record. The Client Detail UI (302) is similar or identical to the Client Detail UI (600). The following is a method of using the Client Detail UI (302):

Step 1. Render Client Detail UI. The Client (300) renders the Client Detail UI (302) with only the fields already rendered in the Client List UI (301).

Step 2. Retrieve Detail Record from Client Cache (304).

Step 2a. If not already in Client Cache (304), get data from Server API (204). If the data record does not already exist in the Client Cache (304), the Client (300) uses the Client Comm Layer (303) to send a request to the Server APIs (204) to retrieve the entire data record. The Server APIs (204) invoke the Data Adapter (201) to retrieve the entire data record from the Data Source (100). After receiving the entire data record from the Server APIs (204), the Client (300) stores the entire data record in the Client Cache (304).

Step 2b. Retrieve Entire Data Record from Client Cache (304). The Client Detail UI (302) retrieves the entire data record from the Client Cache (304).

Step 3. Render entire data record. The entire data record is rendered and the Client Detail UI (302) is updated with fields and values from the entire data record.

In one embodiment, Step 2 and Step 3 as set forth immediately above, occur in a background thread in the Client (300). By executing these steps in the background, the end user can continue to perform other UI operations in the Client (300) while the Client Detail UI (302) is updated.

Persistent Network Connections

In network protocols that have high latency, the Client (300) can open a persistent network connection over the network (402) between the Client (300) and the App Server (200). In one embodiment, the Client (300) opens a TCP socket connection such as using port 80, or using port 443 over SSL. After opening the persistent connection, the Client (300) can send requests to the server without the need to setup and tear down the connection for each request.

Opening a persistent connection is especially helpful when the network connection uses SSL, which requires a series of handshakes to establish a connection. On wireless carrier networks, setup and tear down of a network connection may take, for example, approximately 1 to 4 seconds, as each of the handshake requests require 500 milliseconds or more. To minimize wait time for the end user, the Client UI (300) opens a network connection with the Server APIs (204) as soon as the Client UI (300) program starts.

Persistent network connections may have a user- or administrator-specified timeout specified in, for example, seconds. When the specified timeout is reached without any network activity, the Client UI (300) automatically closes the network connection after a period of inactivity to conserve App Server (200) resources and Client UI (300) resources such as battery life. If specified by the end user, the Client UI (300) has the option to send regular "ping" requests to the App Server (200) before reaching the timeout interval to ensure that the App Server (200) keeps the network connection alive.

If the network connection is closed, such as due to server timeouts or loss of network coverage, the Client UI (300) automatically re-establishes the connection when the Client (300) sends its next network request to the App Server (200).

Client Cache (304)

Figure 12:
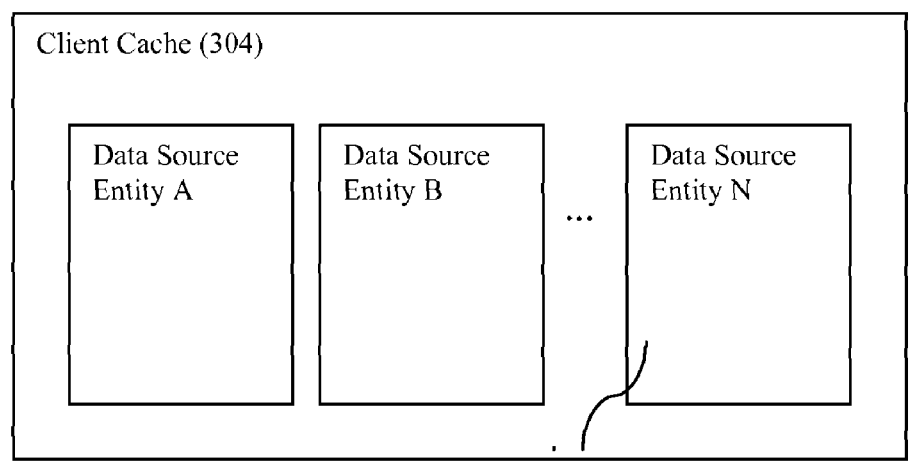
FIG. 12 illustrates a client cache holding data for different Data Source Entities in accordance with one embodiment of the present invention.

As shown in FIG. 12, the Client Cache (304) stores data records that have been retrieved to the Client (300) from the App Server (200). The Client Cache (304) is segmented into multiple partitions. Each partition stores data for each Data Source Entity available in the Client (300). In one embodiment, the Client Cache (304) may be implemented as a set of XML files residing in the client's file system: one XML file per Data Source Entity. In another embodiment, the Client Cache (304) may use database table(s) in a lightweight relational database to store the cache entries. Each Data Source Entity may have its own database table, or all Data Source Entities may share a single database table and the entries are segmented with the use of a data_source_entity database column.

Each entry in the Client Cache (304) stores the list fields for the Data Source Entity. For example, Contact records may contain the Full Name, Company Name and Email Address of the Contact record, while entries for Company records may contain Company Name, Company Phone Number and Company Location.

Figure 13:
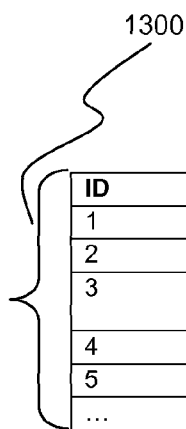
FIG. 13 illustrates exemplary contact list entries in a client cache in accordance with one embodiment of the present invention.

Each entry in the Client Cache (304) has a unique ID field (1300) that uniquely identifies a record. The Client Detail UI (302) uses the ID field to quickly find a record in the Client Cache (304). The entries in the Client Cache (304) may be indexed by the first list field for fast searching of records. The entries in the Client Cache (304) may also be sorted to avoid sorting operations when entries are displayed in the Client List UI (301). FIG. 13 shows sample entries in the Client Cache (304) for a Contact Data Source Entity.

The Client Cache (304) also stores the entire set of detail fields for records if the Client UI (300) has previously retrieved them from the App Server (200). The Client Detail UI (302) renders the data in these detail fields, thereby eliminating the need to send a request to Server APIs (205) when viewing the record in the Client Detail UI (302).

Server List Cache (205)

The Server List Cache (205) is used for improving performance as well as for minimizing external data source API calls that typically impose limit on usage frequency. Server List Cache (205) is also used to improve performance of the Find text box (500). Requests for list data to the Server APIs (204) use the Server List Cache (205) if available.

The Server List Cache (205) stores list column values for a given data source. In one embodiment, the Server List Cache (205) is implemented as a database table in a relational database on the App Server (200). The table has list_col_1, list_col_2, list_col_3, list_col_4 and list_col_rest. Each of these columns has an index defined to improve performance of the Find text box (500).

In another embodiment, which may provide improved performance, the Server List Cache (205) is implemented as a database table but instead has two columns, list_data and list_data_lengths. Column list_data stores a concatenated string of all list column values, and column list_data_lengths stores lengths of individual list column values in list_data. Both columns are indexed for fast search and retrieval.

Server List Cache (205) is refreshed upon each receipt of a complete entity row from an external data source. It can also be updated on periodic schedule or when notifications from the data source are received by the App Server (200).

Server List Cache (205) is controlled by two preferences: cache_server_list and server_list_cache_refresh_interval. These preferences can be updated via an App Server (200) administration web page. The cache_server_list preference specifies whether the Server List Cache (205) is enabled for a given data source entity. The server_list_cache_refresh_interval preference specifies the cache refresh interval in hours. In one embodiment, the default is a 24 hour refresh interval. Updating these preferences starts background processes for populating or cleanup of the Server List Cache (205). In addition, another database table tracks the last time a given Server List Cache (205) has been updated for a given user.

Every time a request to the Server APIs (204) occurs that has cache_server_list preference enabled, the Server APIs (204) verify whether the list_cache_refresh_interval has been reached and refreshes the cache if needed. The Server APIs (204) then perform a lookup against the Server List Cache (205). At the same time in the background, the Server APIs (204) issue a query to the data source with the same query criteria and updates the Server List Cache (205) with new results. In the cases when the query against the data source returns less rows than same criteria against the Server List Cache (205), the Server APIs (204) individually refresh data for rows that may have been deleted or updated on the server that does not satisfy current search criteria.

The Client (300) can also initiate an explicit refresh of the Server List Cache (205) by invoking the Server APIs (204). Optionally, the administrator can schedule background jobs on the App Server (200) to periodically refresh the Server List Caches (205) every server_list_cache_refresh_interval.

Server APIs (204)

The Server APIs (204) are a set of programmatic interfaces used by the Client (300) to retrieve data about a data source entity. In one implementation, the Server APIs (204) are implemented as XML messages accessible over a network protocol such as HTTP. Parameters to each API are passed via url parameters.

The main APIs are listed in the following table:

| XML API | URI | Comment |
| --- | --- | --- |
| Login | api/login | |
| Get Data for an Entity | api/get_data | |
| Get Related Data for en Entity | api/get_related_data | |
| Logout | api/logout | |

It should be noted that the client should first "login" to create a session. Subsequent XML APIs should be called with an _skydata_session HTTP cookie returned by login call.

It should also be noted that every API returns XML with single root element <result> and with mandatory child XML element <message>, that contains required attributes code and message text as a content of XML element.

api/login

Login to SkyData server and return a _skydata_session HTTP cookie that can be used with subsequent (get_data and get_related_data) requests to identify the SkyData user who is executing the Server APIs (204).

Parameters:
email—email of the user.
password—password of the user.
Response:
<result>—with message code 0 on success or 102 or 100 on failure.
Also sets_skydata_session HTTP cookie that should be used in subsequent XML API calls.

api/get_data

Returns data for a given Data Source Entity based on query parameters.

Parameters:
data_source_entity_name—name of the data source entity to retrieve. See results from api/get_subscriptions call.
id—primary key of the entity to retrieve.
id list—comma separated list of primary keys of the entities to retrieve.
search_text—space separate list of terms to be used as full text search, e.g.: "red car".
conditions—sql like search condition, default is " ". E.g.: "name like 'john smith'".
order—sql like sort order, default is " ". E.g.: "last_name, first_name".
offset—offset of the first row to return in the result set, default is "0".
limit—number of data rows to return, default is "25".
list columns_only—if "true" only list column values will be returned; default is "false".
cache—"use" to use data cache, "refresh" to rebuild data cahe and "bypass" to go directly to external data source. Default is "bypass".
cache_min_size—If total number of records in the data source entity is less then cache_min_size then do not build the Server List Cache (205) for the data source entity.
Response—pseudo schema:
<result>
<my-data>
    Attrs:
        data-source-entity-name
    [my-datum]
        ["column names"]
        [related-data]
            Attrs:
                name
            [my-datum]
<message>
    Attrs:
        Code The 'cache' parameter controls whether the Server APIs (204) use the Server List Cache (205).

'bypass'—default)—bypasses Server List Cache (205) and goes directly against the data source.
'refresh'—synchronously rebuilds Server List Cache (205) up to 5,000 rows from the data source. If 'limit' option is less than total number of records in the data source, then do not build Server List Cache (205).

'use'—get results from the Server List Cache (205) that has been previously built, if available. If Server List Cache (205) is not available, will not go against external data source. Note that with this option 'list_columns_only' attribute should always be 'true'; sort can be performed on list columns only and search can be performed only via 'search_text' attribute.

Following is the series of API calls that a client (300) uses to access data from the server list APIs (204).

1. Login to the Server APIs (205) by calling api/login.
2. First time a data source entity is accessed→call api/get_data with the following parameters:
   1. Set 'limit' parameter according to client's (300) cache size. For example, the clients with a high bandwidth network connection may set the limit to 1000 records, while clients with a lower bandwidth network connection may set the limit to 250 records or even 100 records.
   2. Set 'cache' parameter set to 'refresh'.
   3. Set 'cache_min_size'. If the number of records from the data source entity is larger than this parameter, then create the Server List Cache (205) for that data source entity.
3. When getting search results from the Server List Cache (205)→call api/get_data with the following parameters:
   1. Set 'search_text' parameter to text string that end user is looking for.
   2. Set 'cache' option set to 'use'.
4. When end user would like to refresh the client cache (304)→same as (2) above.

In accordance with various embodiments of the present invention, the following are exemplary API calls:

a) For data source entity 'Account—SFDC Test': refresh Server List Cache (205) and get first 100 rows into client list cache (304) http://www.skydata.com/api/get_data?data_source_entity_name=Account%20-20SFDC%20Test&list_columns_only=true&limit=100&cache=refresh
b) For data source entity 'Contact—SFDC Test' cache: refresh Server List Cache (205) and get first 100 rows into client list cache (304) http://www.skydata.com/api/get_data?data_source_entity_name=Contact%20-20SFDC%20Test&list_columns_only=true&limit=100&cache=refresh
c) For data source entity 'Account—SFDC Test': get first 100 rows from the Server List Cache (205) http://www.skydata.com/api/get_data?data_source_entity_name=Contact%20-%20SFDC%20Test&list_columns_only=true&limit=100&cache=use
d) For data source entity 'Contact—SFDC Test': get first 100 rows from the Server List Cache (205) http://www.skydata.com/api/get_data?data_source_entity_name=Contact%20-%20SFDC%20Test&list_columns_only=true&limit=100&cache=use
e) For data source entity 'Contact—SFDC Test': get first 100 records and build the cache if total number of records greater then 1000 https://www.skydata.com/api/get_data?data_source_entity_name=Contact%20-%20SFDC%20Test&list_columns_only=true&limit=100&cache=refresh&cache_min_size=1000
f) For data source entity 'Contact—SFDC Test': find "Edwards" in the Server List Cache (205) https://www.skydata.com/api/get_data?data_source_entity_name=Contact%20-%20SFDC%20Test&list_columns_only=true&search_text=Edwards&cache=use
g) For data source entity 'Contact—SFDC Test': find "Edwards" directly in the data source without using the server list cache (205) https://www.skydata.com/api/get_data?data_source_entity_name=Contact%20-%20SFDC%20Test&list_columns_only=true&search_text=Edwards&cache=bypass api/get_related_data Returns related data for a given Data Source Entity row based on query parameters.

Parameters:
data_source_entity_name—name of the root data source entity for which to retrieve related data. See results from api/get_subscriptions call.
id—primary key of the root entity data row.
related_data_name—name of related data. See the results from api/get_subscriptions call.
list_columns_only—if "true" only list column values will be returned, default is "false".

Response—pseudo schema:
<result>
<my-data>
   [my-datum]
      Attrs:
         data-source-entity-name
      ["column names"]
<message>
   Attrs:
      code api/logout Logout from SkyData server and invalidate a previously set_skydata_session HTTP.

Parameters:
None

Response:
<result>—with message code 0 on success or 100 on failure.

Server API Response Codes

The following is a list of current message codes and texts returned by the APIs:

| Message Code | Text | Comment |
| --- | --- | --- |
| 0 | OK | |
| 100 | Unexpected error: 'actual error message' | |
| 102 | Error: email/password combination is not valid | |
| 103 | Error: not logged in | |
| 300 | Not Modified | |

An embodiment of the invention relates to a computer storage product with a computer-readable or machine-accessible medium having executable instructions or computer code thereon for performing various computer-implemented operations. The term "computer-readable medium" or "machine-accessible medium" is used herein to include any medium that is capable of storing or encoding a sequence of executable instructions or computer code for performing the operations described herein. The media and computer code can be those specially designed and constructed for the purposes of the invention, or can be of the kind well known and available to those having ordinary skill in the computer software arts.

Examples of computer-readable media include computer-readable storage media such as: magnetic media such as hard disks, floppy disks, and magnetic tape; optical media such as Compact Disc-Read Only Memories ("CD-ROMs") and holographic devices; magneto-optical media such as floptical disks; and hardware devices that are specially configured to store and execute program code, such as Application-Specific Integrated Circuits ("ASICs"), Programmable Logic Devices ("PLDs"), Read Only Memory ("ROM") devices, and Random Access Memory ("RAM") devices. Examples of computer code include machine code, such as produced by a compiler, and files containing higher level code that are executed by a computer using an interpreter. For example, an embodiment of the invention may be implemented using Java, C++, or other programming language and development tools. Additional examples of computer code include encrypted code and compressed code. Another embodiment of the invention can be implemented in hard wired circuitry in place of, or in combination with, computer code.

While the invention has been described with reference to the specific embodiments thereof, it should be understood by those skilled in the art that various changes may be made and equivalents may be substituted without departing from the true spirit and scope of the invention as defined by the appended claims. In addition, many modifications may be made to adapt a particular situation, material, composition of matter, method, operation or operations, to the objective, spirit, and scope of the invention. All such modifications are intended to be within the scope of the claims appended hereto. In particular, while the methods disclosed herein have been described with reference to particular operations performed in a particular order, it will be understood that these operations may be combined, sub-divided, or reordered to form an equivalent method without departing from the teachings of the invention. Accordingly, unless specifically indicated herein, the order and grouping of the operations is not a limitation of the invention.

We claim:

1. A computer implemented method comprising:
   executing, by a computing device, a search against a client cache associated with a client;
   determining, by the computing device, whether a number of records received from data sources remotely coupled to the client over a network connection is less than or equal to a size of the client cache;
   rendering, by the computing device, results from the search against the client cache on a client UI;
   not providing, by the computing device, a request to execute the search against the data sources remotely coupled to the client if the number of records received from the data sources is less than or equal to the size of the client cache;
   providing, by the computer device, a request to execute the search against the data sources remotely coupled to the client if it is determined by the computing device that the number of records received from the data sources is not less than or equal to the size of the client cache; and
   updating, by the computing device, the client cache and the client UI with the results from the search against the data sources.

2. The method of claim 1 further comprising initializing the client cache with records.

3. The method of claim 1 further comprising:
   providing an application server as a proxy against which the search is performed;
   providing the network connection between the client and the application server;
   closing the network connection at a predetermined time in the absence of network activity; and
   reestablishing the network connection upon indication of a user.

4. The method of claim 1 further comprising providing a server cache associated with an application server.

5. The method of claim 1 wherein the search against the data sources is optional and does not execute if network connectivity is unavailable.

6. The method of claim 4 further comprising:
   providing the application server as a proxy against which the search is performed;
   providing the network connection between the client and the application server;
   closing the network connection at a predetermined time in the absence of network activity; and
   reestablishing the network connection upon indication of a user.

7. The method of claim 4 further comprising refreshing the server cache with information from the data sources upon request by a user.

8. The method of claim 4 further comprising refreshing the server cache with information from the data sources at an interval specified by a user or an administrator.

9. The method of claim 4 further comprising refreshing the server cache with information from the data sources when the duration since a prior refresh exceeds a predetermined maximum time and upon indication of a user.

10. The method of claim 4 further comprising refreshing the server cache with information from the data sources upon notification from the data sources.

11. The method of claim 1 further comprising providing an index of data in the data sources.

12. The method of claim 1 wherein the duration between the executing and the rendering is less than approximately a second.

13. The method of claim 1 wherein the network connection is a wireless network connection.

14. A non-transitory machine-accessible medium that provides instructions that, if executed by a machine, will cause the machine to perform a method comprising:
   executing a search against a cache associated with a computing device;
   determining whether a number of records received from a data source remotely coupled to the computing device over a network connection is less than or equal to a size of the cache;
   not providing a request, to the data source remotely coupled to the computing device over the network connection, to perform the search against the data source if the number of records received from the data source is less than or equal to the size of the cache;
   rendering results from the search against the cache on a UI;
   providing a request, to the data source remotely coupled to the computing device over the network connection, to perform the search against the data source if the number of records received from the data source is not less than or equal to the size of the cache;
   receiving results from the search against the data source; and
   updating the cache and the UI with the results from the search against the data source.

15. The machine-accessible medium of claim 14 wherein the executing and the providing occur substantially simultaneously.

16. The machine-accessible medium of claim 14 wherein the method further comprises initializing the cache with records.

17. The machine-accessible medium of claim 14 wherein an application server includes a server cache, the method further comprising:
communicating with the application server as a proxy against which the search is performed;
opening the network connection with the application server;
closing the network connection at a predetermined time in the absence of network activity with the application server; and
reestablishing the network connection upon indication of a user.

18. The machine-accessible medium of claim 17 wherein the method further comprises requesting refresh of the server cache with information from the data source.

19. The machine-accessible medium of claim 17 wherein the method further comprises requesting refresh of the server cache with information from the data source at an interval specified by a user or an administrator.

20. A computing device comprising:
a cache against which a search is performed;
a user interface, coupled to the cache, to render results of the search; and
a communications interface, coupled to the cache;
the computing device to determine whether a number of records received from a data source remotely coupled to the computing device over a network connection is less than or equal to a size of the cache, and to not request performance of the search against the data source remotely coupled to the computing device over the network connection if the number of records received from the data source is less than or equal to the size of the cache;
the communications interface to request performance of the search against the data source remotely coupled to the computing device over the network connection if the number of records received from the data source is not less than or equal to the size of the cache; and
wherein the cache and the user interface are updated with the results of the search against the data source.

21. A computer implemented method comprising:
receiving, by a server, a request from a client that (i) executes a search against a client cache associated with the client, (ii) renders results from the search against the client cache on a client UI and (iii) updates the client cache and the client UI with results from a search against data sources remotely coupled to the client over a network connection;
providing, by the server, a request to execute the search against the data sources remotely coupled to the client over the network connection;
determining, by the server, whether results from the search against the data sources includes a number of records that is less than or equal to a size of the client cache; and
returning, by the server, all of the records to the client if the number of records is less than or equal to the size of the client cache.

* * * * *